(12) United States Patent
Queru

(10) Patent No.: US 8,446,363 B1
(45) Date of Patent: *May 21, 2013

(54) ENHANCED INPUT USING TOUCH SCREEN

(75) Inventor: Jean-Baptiste Maurice Queru, Foster City, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/154,853

(22) Filed: Jun. 7, 2011

Related U.S. Application Data

(60) Provisional application No. 61/428,324, filed on Dec. 30, 2010.

(51) Int. Cl.
*G09G 5/00* (2006.01)

(52) U.S. Cl.
USPC .............. 345/156; 345/173; 345/1.2; 345/2.2

(58) Field of Classification Search
USPC .............. 345/156, 169–181, 1.1–1.3, 2.1–2.3
See application file for complete search history.

(56) References Cited

U.S. PATENT DOCUMENTS

| 5,410,326 | A | 4/1995 | Goldstein |
| 5,818,425 | A | 10/1998 | Want et al. |
| 5,880,732 | A | 3/1999 | Tryding |
| 6,781,635 | B1 | 8/2004 | Takeda |
| 7,199,787 | B2 | 4/2007 | Lee et al. |
| 7,624,210 | B2 | 11/2009 | Izutsu |
| 7,730,401 | B2 | 6/2010 | Gillespie et al. |
| 7,835,505 | B2 | 11/2010 | Toyama et al. |
| 7,877,703 | B1 | 1/2011 | Fleming |
| 2002/0102998 | A1 | 8/2002 | Lin |
| 2002/0190920 | A1 | 12/2002 | Kung |
| 2005/0262535 | A1 | 11/2005 | Uchida et al. |
| 2007/0265717 | A1 | 11/2007 | Chang |
| 2007/0271525 | A1* | 11/2007 | Han et al. ........................ 715/786 |
| 2008/0273015 | A1* | 11/2008 | Huang et al. ................... 345/173 |
| 2009/0058822 | A1* | 3/2009 | Chaudhri ........................ 345/173 |
| 2009/0174818 | A1 | 7/2009 | Morita et al. |
| 2009/0225039 | A1* | 9/2009 | Williamson et al. ........... 345/173 |
| 2009/0249359 | A1 | 10/2009 | Caunter et al. |

(Continued)

FOREIGN PATENT DOCUMENTS

| EP | 1858238 A3 | 9/2010 |
| JP | 9244780 A | 9/1997 |
| WO | WO2009143294 A2 | 11/2009 |

OTHER PUBLICATIONS

Wolf, Lilian International Search Report issued in PCT/US2011/049286 on Oct. 21, 2011, 5 pages.

Wolf, Lilian, Written Opinion issued in PCT/US2011/049286 on Oct. 21, 2011, 6 pages.

(Continued)

*Primary Examiner* — Duc Dinh

(74) *Attorney, Agent, or Firm* — Fish & Richardson P.C.

(57) ABSTRACT

Provided are methods and systems for enhanced input using a touch screen, as well as computer programs encoded on computer storage devices and configured to perform the actions of the methods. One or more applications executing on a mobile device receive a user input through the touch screen of the mobile device, without displaying information identifying a command associated with the user input on the touch screen. The one or more applications then determine the command associated with the received user input and display a result of applying the command on an external display that is connected to the mobile device.

20 Claims, 6 Drawing Sheets

U.S. PATENT DOCUMENTS

| | | | |
|---|---|---|---|
| 2010/0105370 A1* | 4/2010 | Kruzeniski et al. | 455/414.3 |
| 2010/0134385 A1 | 6/2010 | Roth et al. | |
| 2010/0250816 A1 | 9/2010 | Collopy et al. | |
| 2010/0261508 A1* | 10/2010 | Chang et al. | 455/566 |
| 2011/0025611 A1* | 2/2011 | Yoo et al. | 345/173 |
| 2011/0072394 A1* | 3/2011 | Victor | 715/821 |
| 2011/0134030 A1* | 6/2011 | Cho | 345/157 |
| 2011/0185390 A1 | 7/2011 | Faenger et al. | |
| 2011/0205163 A1 | 8/2011 | Hinckley et al. | |
| 2011/0227844 A1 | 9/2011 | Kim | |
| 2011/0252307 A1 | 10/2011 | Williamson et al. | |

OTHER PUBLICATIONS

Harris, Dorothy H., Office Action issued in U.S. Appl. No. 12/943,444 on Nov. 25, 2011, 23 pages.

Harris, Dorothy H., Office Action issued in U.S. Appl. No. 13/250,428 on Nov. 28, 2011, 25 pages.

Dinh, Duc Q., Final Office Action issued in U.S. Appl. No. 13/249,375 on Mar. 27, 2012, 15 pages.

Dinh, Duc Q., Notice of Allowance issued in U.S. Appl. No. 13/249,375 on Sep. 28, 2012, 12 pages.

* cited by examiner

_104_

|  | TAP | SWIPE UP | SWIPE DOWN | SWIPE LEFT | SWIPE RIGHT |
|---|---|---|---|---|---|
| REGION 1 | Last Song | Last Song | Last Song | Last Song | Last Song |
| REGION 2 | Pause/Play | Pause/Play | Pause/Play | Pause/Play | Pause/Play |
| REGION 3 | Next Song | Next Song | Next Song | Next Song | Next Song |
| REGION 4 | N/A | N/A | N/A | Rewind | Fast Forward |
| REGION 5 | N/A | Increase Volume | Decrease Volume | N/A | N/A |

_304_

|  | TAP | DOUBLE TAP | SWIPE LEFT | SWIPE RIGHT |
|---|---|---|---|---|
| REGION 1 | Brake | Brake Hard | N/A | N/A |
| REGION 2 | Accelerate | Accelerate | N/A | N/A |
| REGION 3 | N/A | N/A | Veer Left | Veer Right |
| REGION 4 | N/A | Activate Booster | N/A | N/A |

_305_

|  | TAP | SWIPE UP | SWIPE DOWN | SWIPE LEFT | SWIPE RIGHT |
|---|---|---|---|---|---|
| REGION 1 | Next Document | N/A | N/A | Next Document | Next Document |
| REGION 2 | Next Chapter | N/A | N/A | Next Chapter | Last Chapter |
| REGION 3 | Next Page | N/A | N/A | Next Page | Last Page |

FIG. 3

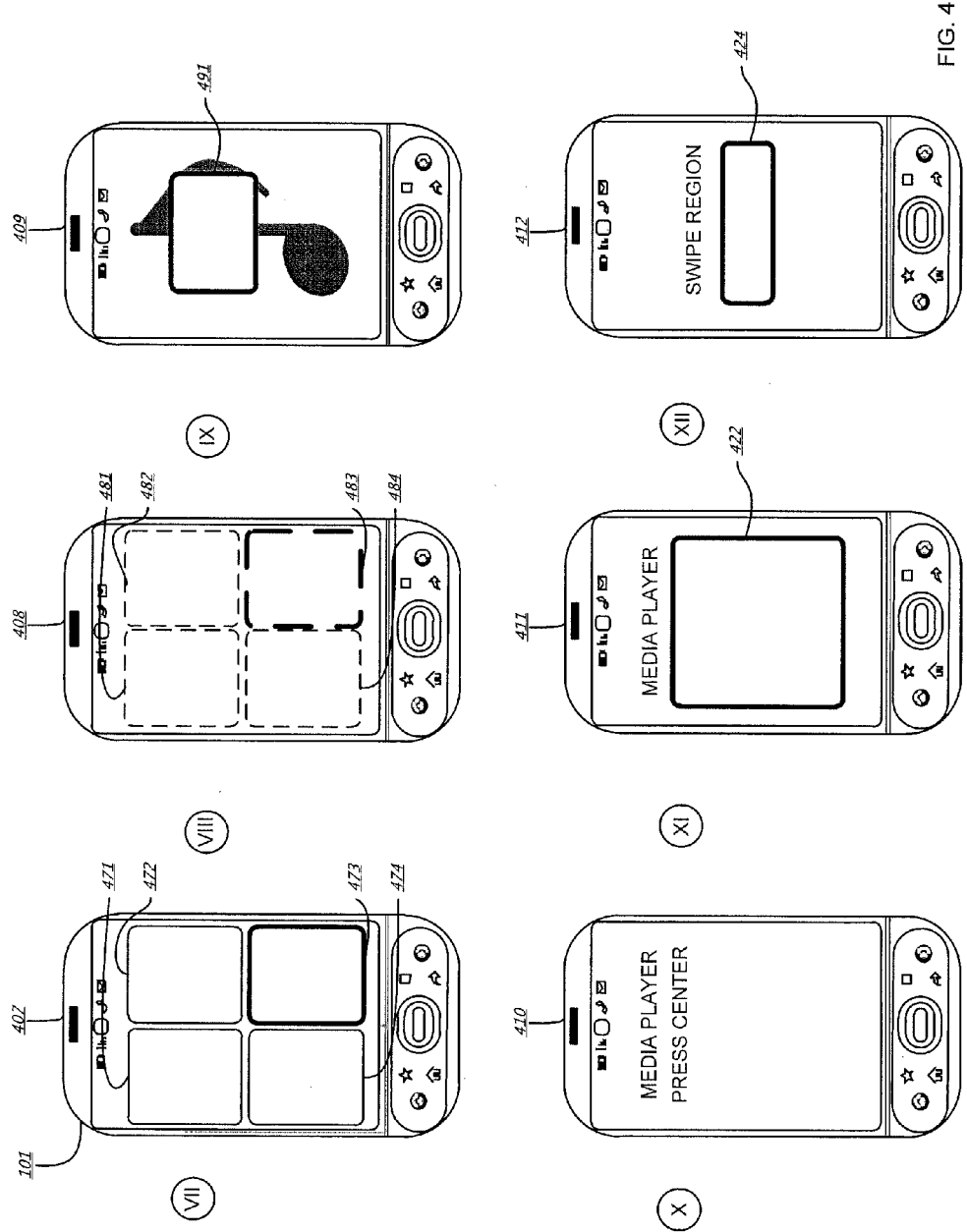

ENHANCED INPUT USING TOUCH SCREEN

CROSS-REFERENCE TO RELATED APPLICATION

This application claims the benefit of U.S. Pat. App. No. 61/428,324, filed Dec. 30, 2010, which is incorporated herein by reference.

BACKGROUND

Mobile devices, such as smart phones, personal digital assistants (PDAs), and other mobile computing devices, typically include a touch screen, through which the user of the mobile device can provide input, and through which the mobile device can display information to the user. Commonly, a single touch screen is used to input information to, and output information from, the mobile device. Because mobile devices are sized so as to be portable, the touch screen is typically small compared to display devices such as televisions and computer monitors. As such, the amount of information that can be displayed on the touch screen of a mobile device is limited.

SUMMARY

According to one general implementation, a user may input commands to a mobile device that is connected to an external display using the touch screen of the mobile device. The touch screen itself may not display information, e.g., icons or text, identifying the command that is being input. Rather, the command may be inferred by the nature of the input itself, such as when a gesture associated with the input suggests that a user intends to scroll or fling a screen object, or the command may be associated with a region of the touch screen through which the input is provided.

In one aspect, one or more applications executing on a mobile device receive a user input through the touch screen of the mobile device, without displaying information identifying a command associated with the user input on the touch screen. The one or more applications then determine the command associated with the received user input and display a result of applying the command on an external display that is connected to the mobile device.

These and other embodiments may each optionally include one or more of the following features. For instance, in some embodiments the one or more applications display nothing on the touch screen when the user input is received. In other embodiments, when the user input is received, the one or more applications display information on the touch screen other than information identifying the command that is being input, but display nothing in the region of the touch screen with which the user interacted.

In some embodiments, determining the command associated with the user input involves the identification, by the one or more applications, of additional information. For instance, in some embodiments, before receiving the user input, the one or more applications define one or more input regions within the touch screen. The one or more applications then identify an input region associated with the user input and determine the command associated with the identified input region. In some embodiments, the one or more applications identify a gesture associated with the user input and determine the command associated with the identified gesture. In other embodiments, the one or more applications identify a state of the application and determine the command associated with the state.

In some embodiments, the command is a navigation control command, a gaming control command, or a media control command.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below.

Other potential features, aspects, and advantages of the subject matter will become apparent from the description, the drawings, and the claims.

BRIEF DESCRIPTION OF THE DRAWINGS

FIG. 3 illustrates exemplary command tables.

FIG. 4 illustrates example conceptual views displayed by an application on a touch screen of a mobile device during example states.

Like reference numbers and designations in the various drawings indicate like elements.

DETAILED DESCRIPTION

Figure 1:
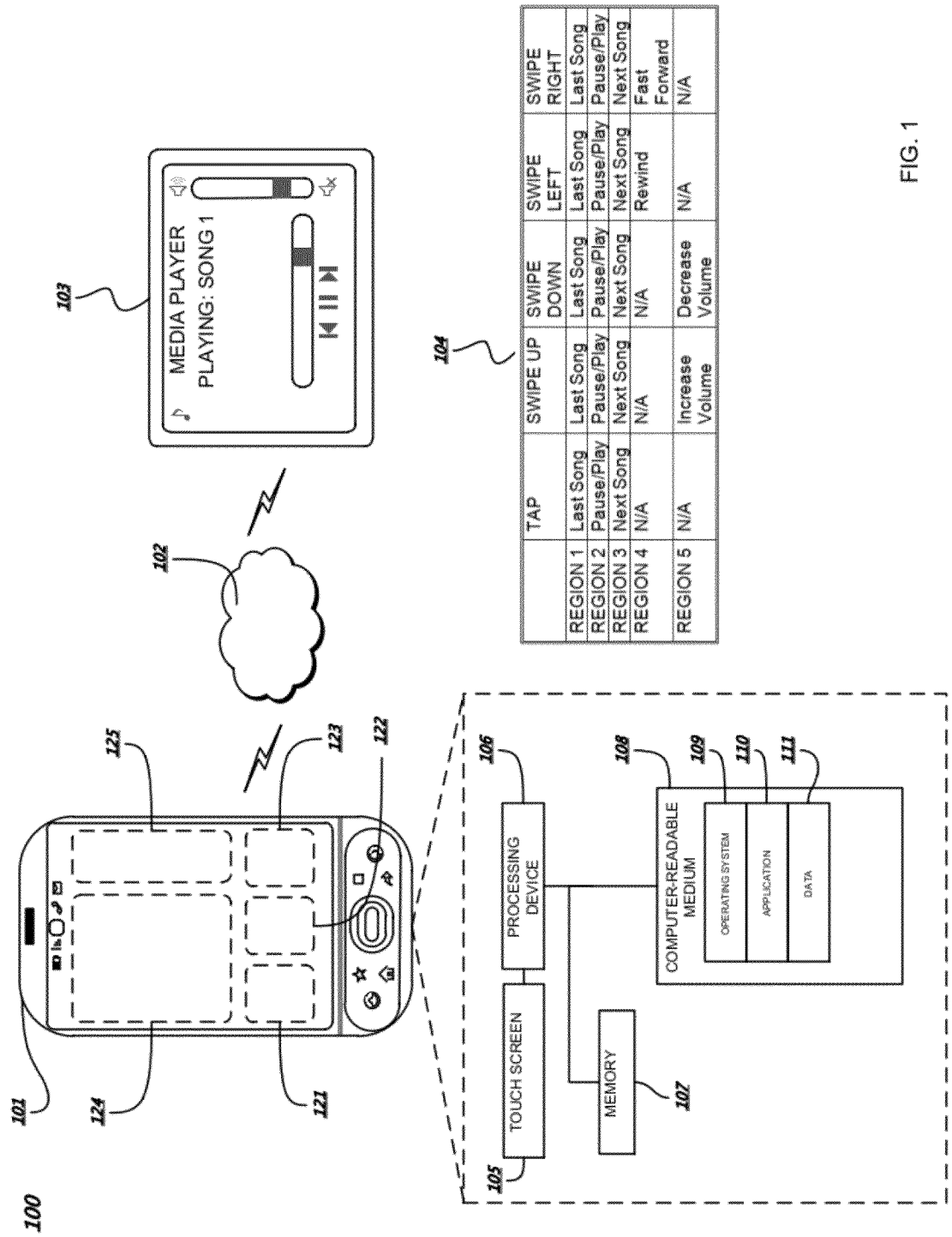
FIG. 1 is a diagram of an example system that may receive user inputs using a touch screen.

FIG. 1 is a diagram of an example system that may receive user inputs using a touch screen. The system 100 includes a mobile device 101 and an external display 103. The mobile device 101 and the external display 103 may be connected via network 102. In some implementations, however, mobile device 101 and external display 103 may be directly connected through, e.g., a Digital Visual Interface (DVI) connection. Network 102 may include one or more networks, such as a local area network, a wide area network, and/or the Internet. One or more of the networks that make up network 102 may be wireless, such as a cellular telephone network or a Wi-Fi network.

Mobile device 101 may be a smartphone, or any other appropriate computer device. Generally speaking, a smartphone is a mobile device that offers advanced computing capabilities, such as the ability to execute applications and to communicate with other computing devices and with peripheral devices such as external display 103. Mobile device 101 may include a computer-readable medium 108 for storing data 111 and computer programs such as application 110, and a processing device 106 (e.g., a microprocessor) and memory 107 (e.g., RAM) for executing computer programs. A touch screen 105 displays, to a user, information and images that are generated by mobile device 101. The touch screen 105 is touch-sensitive, enabling a user to provide input by interacting with various regions of the screen. For example, a user may provide input via a virtual keyboard or by input regions defined by applications executing on the mobile device.

In addition, mobile device 101 may include other input/output devices 113. For example, a physical QWERTY keyboard and/or a scroll wheel may be provided for user input. Mobile device 101 may also include an audio output device 112. Mobile device 101, and computer applications executed thereon, may also be configured to accept commands through other input mechanisms, such as voice commands, and to perform functions in response to such commands.

Mobile device 101 runs an operating system 109. Computer programs, including applications, are stored, e.g., in computer-readable medium 108, and execute on top of the operating system. Among these computer programs is application 110, which may interface with other applications of the mobile device. Application 110 may be, e.g., a navigation application, a gaming application, or a media application. Although application 110 is depicted and described as a single application, application 110 may be one or more applications configured to perform the processes described herein. The information involved in the processes described herein may be stored as data 111 on computer-readable medium 108 of the mobile device.

When executed on mobile device 101, application 110 receives user input through touch screen 105 of the mobile device, without displaying information identifying a command associated with the user input on the touch screen. For example, in some implementations the application is configured such that, when the user input is received, nothing is displayed by the application on the touch screen. In other implementations, the application is configured such that, when the user input is received, nothing is displayed by the application in the region of the touch screen with which the user has interacted.

The nature of the user input, e.g., the gesture used to effect the input or the location through which the input is received, may be suggestive to the user of the command, thereby eliminating the need to display information identifying the command on the touch screen. For instance, the user may intuitively touch the right side of a screen to invoke a "fast forward" command when a media player application is playing, or touch the center of the touch screen to "pause" a slide show. In either case, the application receiving the command does not need to display information identifying the command on the touch screen itself.

After receiving user input, application 110 identifies a command associated with the received input, applies the command, and displays a result of applying the command on external display 103. For example, when executed on the mobile device 101, application 110 may define one or more input regions within the touch screen 105. Having defined input regions within the touch screen, the application may identify an input region associated with the user input when the user input is received, and may determine the command associated with the identified input region. In FIG. 1, e.g., application 110 has defined five regions within touch screen 105 of mobile device 101. These are input regions 121, 122, 123, 124, and 125.

Upon receiving user input and identifying an associated input region, application 110 may reference data 111, stored within computer-readable medium 108 of mobile device 101, in order to determine the command associated with the identified input region. For example, application 110 may reference command table 104, included within data 111. Command table 104 specifies media control commands associated with five regions: 1, 2, 3, 4, and 5. These regions may correspond to, e.g., 121, 122, 123, 124, and 125, respectively. In determining the command associated with received user input, application 110 may further identify a gesture associated with the user input. Command table 104 includes gestures that may be associated with user input: tap, swipe up, swipe down, swipe left, and swipe right. Application 110 may further identify a state of the application 110, and determining the command based on the received user input may further comprise determining the command associated with the state.

After determining the command, application 110 applies the command, and displays the result of applying the command on external device 103, which is connected to mobile device 101, e.g., through network 102. For instance, the application 110 inputs the command to itself (or to another application), causing the application 110 (or the other application) to display a user interface in a subsequent state on the external device 103.

Figure 2:
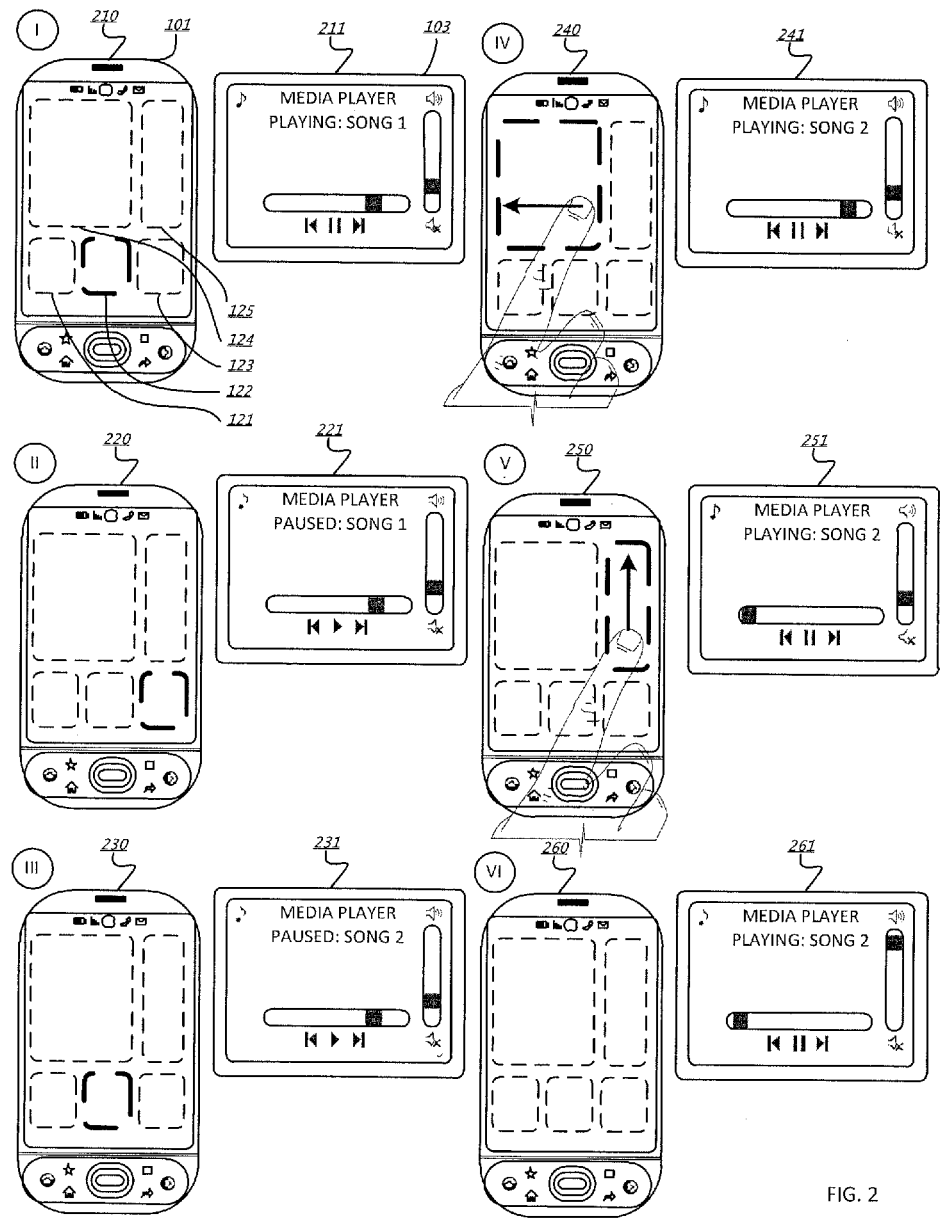
FIG. 2 illustrates example conceptual views that are displayed on a mobile device and on an external display during examples states.

FIG. 2 illustrates example conceptual views that are displayed on a mobile device and on an external display during examples states. Specifically, FIG. 2 illustrates six example conceptual views, 210, 220, 230, 240, 250, and 260, that are displayed on mobile device 101 during example states (I), (II), (III), (IV), (V), and (VI), respectively. Also illustrated are six example conceptual views, 211, 221, 231, 241, 251, and 261, that are displayed on external display 103 during example states (I), (II), (III), (IV), (V), and (VI), respectively. Together, these twelve conceptual views provide multiple examples of the application of a process for receiving user input through the touch screen of a mobile device, without displaying information identifying a command associated with the user input on the touch screen, determining a command associated with the received user input, and displaying a result of applying the command to an external display connected to the mobile device. The example states (I), (II), (III), (IV), (V), and (VI) may be time-sequenced states, or they may occur in a sequence that is different than the illustrated sequence.

In more detail, at state (I), depicted by conceptual views 210 and 211, media player application 110 receives a user input through touch screen 105 of mobile device 101, without displaying information identifying a "pause" command associated with the user input on touch screen 105. Before receiving the user input, media application 110 defined five input regions within the touch screen: 121, 122, 123, 124, and 125. Application 110 identifies an input region associated with the user input, in this case input region 122. Application 110 also identifies a gesture associated with the user input, in this case a tap. Application 110 further identifies a state of application 110.

As illustrated by conceptual view 211, at state (I) media player application 110 is playing "song 1." After identifying the input region, gesture, and state, application 110 selects the command associated with the user input with reference to command table 104, included in data 111 stored in computer-readable medium 108 of mobile device 110. As illustrated by command table 104 in FIG. 1, the media control command associated with a user input in the form of a tap gesture received in region 122 while application 110 is playing a song is "Pause." As such, application 110 determines that the command associated with the received user input is "Pause." Before transitioning to state (II), application 110 applies the "Pause" command by inputting or otherwise applying a "pause" signal.

At state (II), application 110 displays the result of applying the "Pause" command on external display 103, as depicted by conceptual view 221. Also, at state (II), media player application 110 receives an additional user input through touch screen 105 of mobile device 101, without displaying information identifying a command associated with the user input on touch screen 105. Application 110 identifies an input region associated with the user input, in this case input region 123. Application 110 also identifies a gesture associated with the user input, in this case a tap. Application 110 further identifies a state of application 110.

As illustrated by conceptual view 211, at state (II) media player application 110 is paused at song 1. After identifying the input region, gesture, and state, application 110 determines the command associated with the user input with reference to command table 104. As illustrated by command table 104 in FIG. 1, the media control command associated with a user input in the form of a tap gesture received in region 123 is "Next Song." As such, application 110 determines that the command associated with the received user input is "Next Song." Before transitioning to state (III), application 110 applies the "Next Song" command.

At state (III), application 110 displays the result of applying the "Next Song" command on external display 103, as depicted by conceptual view 231. Also, at state (III), media player application 110 receives an additional user input through touch screen 105 of mobile device 101, without displaying information identifying a command associated with the user input on touch screen 105. Application 110 identifies an input region associated with the user input, in this case input region 122. Application 110 also identifies a gesture associated with the user input, in this case a tap. Application 110 further identifies a state of application 110.

As illustrated by conceptual view 211, at state (III) media player application 110 is paused at song 2. After identifying the input region, gesture, and state, application 110 determines the command associated with the user input with reference to command table 104. As illustrated by command table 104 in FIG. 1, the media control command associated with a user input in the form of a tap gesture received in region 123 while application 110 is playing a song is "Play." As such, application 110 determines that the command associated with the received user input is "Play." Before transitioning to state (IV), application 110 applies the "Play" command.

At state (IV), application 110 displays the result of applying the "Play" command on external display 103, as depicted by conceptual view 241. Also, at state (IV), media player application 110 receives an additional user input through touch screen 105 of mobile device 101, without displaying information identifying a command associated with the user input on touch screen 105. Application 110 identifies an input region associated with the user input, in this case input region 124. Application 110 also identifies a gesture associated with the user input, in this case a swipe to the left. Application 110 further identifies a state of application 110.

As illustrated by conceptual view 241, at state (IV) media player application 110 is nearly finished playing song 2. After identifying the input region, gesture, and state, application 110 determines the command associated with the user input with reference to command table 104. As illustrated by command table 104 in FIG. 1, the media control command associated with a user input in the form of a swipe left gesture received in region 124 is "Rewind." As such, application 110 determines that the command associated with the received user input is "Rewind." Before transitioning to state (V), application 110 applies the "Rewind" command.

At state (V), application 110 displays the result of applying the "Rewind" command on external display 103, as depicted by conceptual view 251. Also, at state (V), media player application 110 receives an additional user input through touch screen 105 of mobile device 101, without displaying information identifying a command associated with the user input on touch screen 105. Application 110 identifies an input region associated with the user input, in this case input region 125. Application 110 also identifies a gesture associated with the user input, in this case an upward swipe. Application 110 further identifies a state of application 110.

As illustrated by conceptual view 251, at state (V) media player application 110 is playing song 2 at a low volume. After identifying the input region, gesture, and state, application 110 determines the command associated with the user input with reference to command table 104. As illustrated by command table 104 in FIG. 1, the media control command associated with a user input in the form of a swipe up gesture received in region 125 is "Increase Volume." As such, application 110 determines that the command associated with the received user input is "Increase Volume." Before transitioning to state (V), application 110 applies the "Increase Volume" command.

At state (VI), application 110 displays the result of applying the "Increase Volume" command on external display 103, as depicted by conceptual view 261.

In the preceding examples, illustrated by the conceptual views of FIG. 2, application 110 is a media player application, and the commands associated with received user input are the media control commands of command table 104. However, other implementations are possible.

For example, in one implementation, application 110 may be a gaming application, and the commands associated with received user inputs may be gaming control commands. In a different implementation, application 110 may be a navigation application, and the commands associated with received user inputs may be navigation control commands. FIG. 3 illustrates additional command tables that can be included in data 111 stored in computer-readable medium 108 of mobile device 101. Command table 304 contains gaming control commands, and command table 305 contains navigation control commands.

In an implementation in which application 110 is a gaming application, it could receive a user input through touch screen 105 of mobile device 101, without displaying information identifying a command associated with the user input on touch screen 105. Gaming application 110 could then reference command table 304 in order to determine a gaming control command associated with the received user input and could then display the result of applying the gaming control command on external display device 103.

In an implementation in which application 110 is a navigation application, it could receive a user input through touch screen 105 of mobile device 101, without displaying information identifying a command associated with the user input on touch screen 105. Navigation application 110 could then reference command table 305 in order to determine a navigation control command associated with the received user input and could then display the result of applying the navigation control command on external display device 103.

In a different implementation, application 110 may be a display application that interacts with other applications stored in computer-readable medium 108 of mobile device 101, or on other computing devices accessible to mobile device 101 through network 102. Display application 110 could interact with these other applications using an Application Programming Interface (API).

For example, display application 110, executing on mobile device 101, could receive user input through touch screen 105 of the mobile device without displaying information identifying a command associated with the user input on touch screen 105. Application 110 could then identify that, in its current state, it is interacting with a media player application. Having identified that it is interacting with a media player application, external display application 110 could then determine a command associated with that state, and with the received user input, by referencing the media control commands of command table 104. If application 110 had instead identified that it was interacting with a gaming application, it could determine a command associated with that state, and with the received user input, by instead referencing the gaming control commands of command table 304. Finally, if application 110 had identified that it was interacting with a navigation application, it could determine a command associated with that state, and with the received user input, by referencing the navigation control commands of command table 305. Having determined a command associated with its state and with the received user input, display application 110 could then display a result of applying the command on external display 103, connected to mobile device 101 through network 102.

A person having ordinary skill in the art will recognize, however, that these examples are not limiting, and that display application 110 could interact with any number of other applications stored in computer-readable medium 108 of mobile device 101 or accessible to mobile device 101 through network 102.

FIG. 2 illustrated an example in which nothing is displayed by application 110 on touch screen 105 of mobile device 101 when it receives user input. However, in other implementations, application 110 might display information on touch screen 105, other than information identifying a command associated with the user input, when it receives user input. FIG. 4 illustrates example conceptual views displayed by an application on a touch screen of a mobile device during example states. Specifically, FIG. 4 illustrates six example conceptual views, 407, 408, 409, 410, 411, and 412, displayed by application 110 on touch screen 105 during example states (VII), (VIII), (IX), (X), (XI), and (XII), respectively.

For example, in an implementation in which application 110 is a media player application executing on mobile device 101, the application 110 receives a user input through touch screen 105, without displaying information identifying a command associated with the user input, during each of example states (VII)-(XII). However, application 110 may display other information on touch screen 105 when it receives user input.

At state (VII), illustrated by conceptual view 407, application 110 defines four user input regions within touch screen 105 of mobile device 101: 471, 472, 473, and 474. Application 110 displays borders around these regions, without identifying a command associated with the user input, when it receives user input. In state (VIII), illustrated by conceptual view 408, application 110 defines four regions within touch screen 105, 481, 482, 483, and 484, but displays nothing on touch screen 105 when it receives user input. In state (IX), illustrated by conceptual view 409, application 110 defines a single user input region within the touch screen 105, 491, and displays a border around that region along with a background image when it receives user input. However, application 110 displays nothing within the region 110, the region with which the user interacted.

In state (X), illustrated by conceptual view 410, application 110 displays the text "MEDIA PLAYER" and "PRESS CENTER" on touch screen 105 when it receives user input. In state (XI), illustrated by conceptual view 411, application 110 defines a single user input region 422, and displays a border around that region along with the text "MEDIA PLAYER" when it receives user input. Finally, at state (XII), illustrated by conceptual view 412, application 110 defines a single user input region 424, and displays a border around that region along with the text "SWIPE REGION" when it receives user input.

Figure 5:
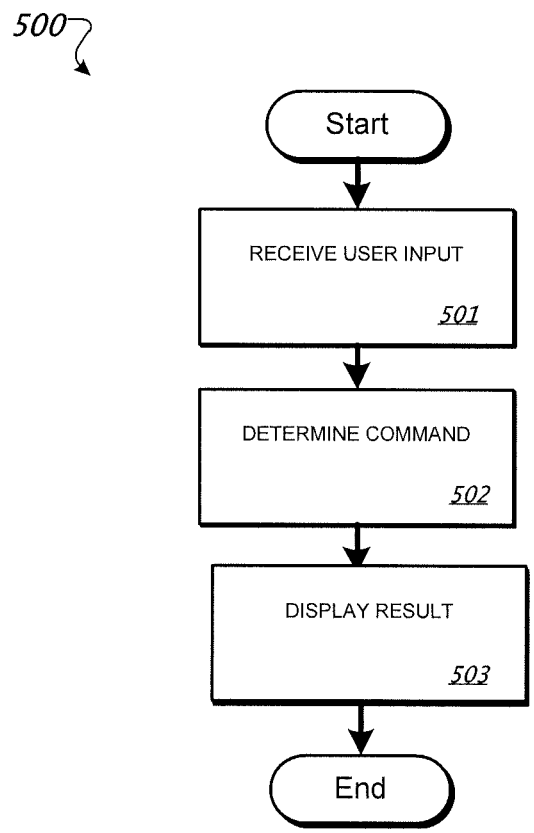
FIG. 5 is a flowchart of an example process for receiving user inputs using a touch screen.

FIG. 5 is a flowchart of an example process for receiving user inputs using a touch screen. The process 500 may be implemented, for example, using system 100. In such an implementation, one or more parts of the process may be executed by application 110, which may interface with other applications of the mobile device 101, or with applications accessible by the mobile device through network 102. Application 110 may retrieve information involved in the process, such as information used in associating commands with received user input, from one or more local or remote data sources, such as computer-readable medium 108 of the mobile device 101.

Referring to FIG. 5, application 110 executing on mobile device 101 receives user input through touch screen 105, without displaying information identifying a command associated with the user input on the touch screen (501). Before receiving the user input, application 110 may define one or more input regions within touch screen 110. After receiving the user input, application 110 determines a command associated with the received user input (502). Before determining the command, application 110 may identify an input region associated with the user input, may identify a gesture associated with the user input, or may identify a state of application 110. In determining the command associated with the received user input, application 110 may determine the command associated with the identified input region, gesture, or state. Following the determination, application 110 displays a result of applying the determined command on external display 103, which is connected to mobile device 101 (503).

Figure 6:
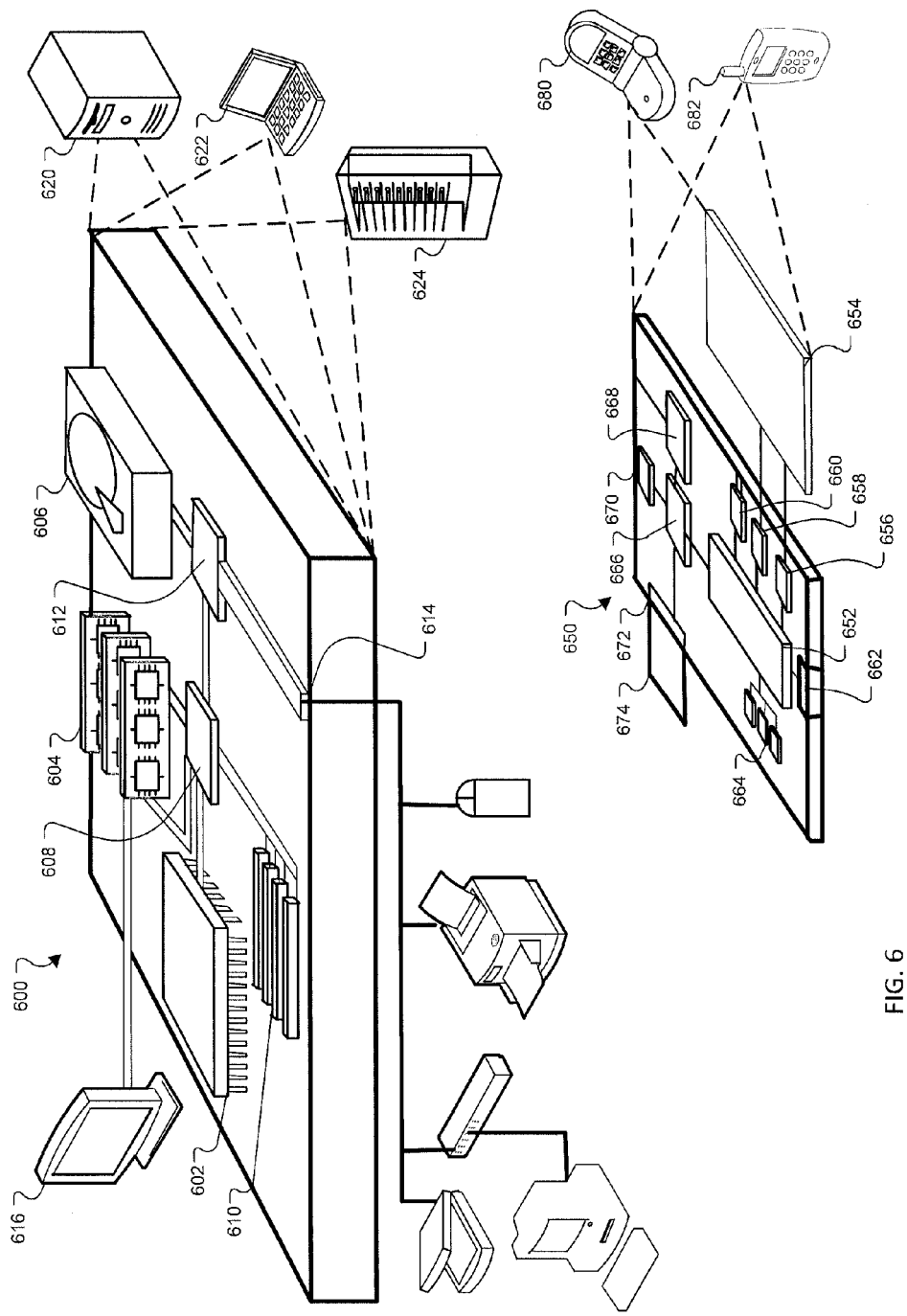
FIG. 6 shows an example of a computer device and a mobile computing device that can be used to implement the described processes.

FIG. 6 shows an example of a generic computer device 600 and a generic mobile computer device 650, which may be used to implement the processes described herein, including the mobile-side and server-side processes for installing a computer program from a mobile device to a computer. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 604, the storage device 606, memory on processor 602, or a propagated signal. For example, the information carrier may be a non-transitory, machine-readable storage medium.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a manner that is not modifiable by the end-user.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer-implemented method comprising:
defining, by an application executing on a mobile device that (i) has a touch screen on which a first user interface is displayed, and (ii) is operatively coupled to, and provides a different, second user interface for display on, an external display, two or more non-overlapping input regions on the touch screen;
displaying, by the application executing on the mobile device, a border around each of the non-overlapping input regions in the first user interface on the touch screen, without displaying information that explicitly identifies a respective command associated with each input region in the first user interface on the touch screen;
receiving, by the application executing on the mobile device, a user input at a first input region from the two or more non-overlapping input regions on the touch screen;
determining, by the application executing on the mobile device, a command associated with the user input at the first input region; and
outputting, by the application executing on the mobile device, and for display at the external display, an updated second user interface, the updated second user interface being based on execution of the command.

2. The method of claim 1, wherein the two or more input regions are defined by the application before the user input is received.

3. The method of claim 1, comprising:
identifying a state of the application;
wherein determining the command further comprises determining the command associated with the state of the media player application executing on the mobile device.

4. The method of claim 1, comprising displaying information identifying the application in the first user interface on the touch screen.

5. The method of claim 1, comprising displaying information identifying one or more gestures associated with each respective command.

6. The method of claim 1, wherein the application comprises a navigation application.

7. The method of claim 1, wherein the application comprises a gaming application.

8. A mobile device comprising:
an external display interface through which the mobile device is operatively coupled to, and provides a second user interface for display on, an external display;
a touch screen on which a first user interface is displayed;
one or more processors; and a non-transitory computer-readable storage medium coupled to the one or more processors having instructions stored thereon which, if executed by the one or more processors, cause the one or more processors to perform operations comprising:

defining, by an application executing on the mobile device, two or more nonoverlapping input regions on the touch screen;

displaying, by the application executing on the mobile device, a border around each of the non-overlapping input regions in the first user interface on the touch screen, without displaying information identifying a respective command associated with each input region in the first user interface on the touch screen;

receiving, by the application executing on the mobile device, a user input at a first input region from the two or more non-overlapping input regions on the touch screen;

determining, by the application executing on the mobile device, a command associated with the user input at the first input region; and outputting, by the application executing on the mobile device, and for display at the external display, an updated second user interface, the updated second user interface being based on execution of the command.

9. The device of claim 8, wherein the two or more input regions are defined by the application before the user input is received.

10. The device of claim 8, wherein the operations comprise:

identifying a state of the application;

wherein determining the command further comprises determining the command associated with the state of the application executing on the mobile device.

11. The device of claim 8, wherein the operations comprise displaying information identifying the application in the first user interface on the touch screen.

12. The device of claim 8, wherein the operations comprise displaying information identifying one or more gestures associated with each respective command.

13. The device of claim 8, wherein the application comprises a navigation application.

14. The device of claim 8, wherein the application comprises a gaming application.

15. A non-transitory computer storage medium encoded with a computer program, the program comprising instructions that when executed by a data processing apparatus cause the data processing apparatus to perform operations comprising:

defining, by an application executing on a mobile device that (i) has a touch screen on which a first user interface is displayed, and (ii) is operatively coupled to, and provides a different, second user interface for display on, an external display, two or more non-overlapping input regions on the touch screen;

displaying, by the application executing on the mobile device, a border around each of the non-overlapping input regions in the first user interface on the touch screen, without displaying information that explicitly identifies a respective command associated with each input region in the first user interface on the touch screen;

receiving, by the application executing on the mobile device, a user input at a first input region from the two or more non-overlapping input regions on the touch screen;

determining, by the application executing on the mobile device, a command associated with the user input at the first input region; and outputting, by the application executing on the mobile device, and for display at the external display, an updated second user interface, the updated second user interface being based on execution of the command.

16. The medium of claim 15, wherein the two or more input regions are defined by the application before the user input is received.

17. The medium of claim 15, wherein the operations comprise:

identifying a state of the application;

wherein determining the particular command further comprises determining the particular command associated with the state of the media player application executing on the mobile device.

18. The medium of claim 15, wherein the operations comprise displaying information identifying the application in the first user interface on the touch screen.

19. The medium of claim 15, wherein the operations comprise displaying information identifying one or more gestures associated with each respective command.

20. The medium of claim 15, wherein the application comprises a navigation application.

* * * * *

UNITED STATES PATENT AND TRADEMARK OFFICE
CERTIFICATE OF CORRECTION

PATENT NO. : 8,446,363 B1
APPLICATION NO. : 13/154853
DATED : May 21, 2013
INVENTOR(S) : Jean Baptiste Maurice Queru It is certified that error appears in the above-identified patent and that said Letters Patent is hereby corrected as shown below:

In the Claims

Column 12, line 50, Claim 3, please delete "media player";

Column 14, line 34, Claim 17, please delete "particular";

Column 14, line 35, Claim 17, please delete "media player"; and

Column 14, line 36, Claim 17, please delete "particular".

Signed and Sealed this
Sixth Day of August, 2013

Teresa Stanek Rea
*Acting Director of the United States Patent and Trademark Office*